Nov. 5, 1963  A. NOYES, JR  3,110,028
FLAG CONTROL CIRCUIT
Filed Feb. 10, 1960  2 Sheets-Sheet 1

INVENTOR.
ATHERTON NOYES, JR.
BY
Mead, Browne, Schuyler & Beveridge
ATTORNEYS

Nov. 5, 1963   A. NOYES, JR   3,110,028
FLAG CONTROL CIRCUIT
Filed Feb. 10, 1960   2 Sheets-Sheet 2

INVENTOR.
ATHERTON NOYES, JR.
BY
Mead, Browne, Schuyler & Beveridge
ATTORNEYS

United States Patent Office 3,110,028
Patented Nov. 5, 1963

3,110,028
FLAG CONTROL CIRCUIT
Atherton Noyes, Jr., Mountain Lakes, N.J., assignor to Aircraft Radio Corporation, Boonton, N.J., a corporation of New Jersey
Filed Feb. 10, 1960, Ser. No. 7,912
5 Claims. (Cl. 343—107)

This invention relates to an alarm circuit for omnirange navigation systems and particularly concerns an improved circuit for operating a flag in the absence of a signal in either channel of an omnirange receiver as well as under conditions when signal strength falls below a desired level. Omnirange systems are now commonly referred to as VOR stations, and VOR and omni are used interchangeably herein.

Operation of a direction indicator, such as the vertical pointer of a cross pointer meter, by means responsive to phase differences between the 30-cycle outputs of the two channels of an omnireceiver will give an "on course" indication if the signal fails or if the signal in one channel disappears. This is because in the usual receiver the "on course" indication is zero current in a wattmeter type of circuit occurring when the two 30-cycle wattmeter inputs are in phase quadrature. Zero current also occurs in this type of circuit if one input is missing.

An alarm flag is usually provided and operated by the combined outputs of the receiver channels to indicate the absence of an omni signal or too low a signal level for satisfactory operation. While such flags are satisfactory to indicate failure or weakness of a normal signal, they may not indicate adequately the absence of a signal in only one channel. Such signal disappearance may be caused by failure of one channel amplifier or the other in the receiver as well as by malfunction of the ground transmitter.

It is desirable to adjust the alarm circuit so the flag will begin to provide an indication when the signal level in each channel drops to about one half of the normal level; that is, when the signal approximates one half of a normal signal, as occurs when the transmitter is nearly out of range. However, an alarm circuit adjusted to respond to such a condition may not give a positive indication if the signal in one channel fails completely (for any reason, as mentioned above) while the signal in the other channel remains at normal strength.

It is therefore a major object of this invention to provide an alarm circuit operating a flag in the absence of a signal in either channel of the receiver or upon failure of either channel of the receiver.

In the attainment of this and other objectives, each channel of the radio navigation receiver is provided, according to this invention, with disabling means for rendering the channel partially inoperative, and the disabling means in each channel is actuated in response to a major decrease in signal strength in the other channel. For example, in the case of an omnirange receiver, disabling means in the reference channel is connected to the variable signal channel and is responsive to a decrease in signal in the variable signal channel for actuating the disabling means in the reference signal channel to reduce the sensitivity of the reference signal channel. In this way, an alarm indicator connected in circuit with the directional indicator is positively operated in response to a major decrease in signal strength in the variable signal channel. By similar cross-connection between disabling means in the variable signal channel and an actuating connection to the reference signal channel, the sensitivity of the variable signal channel may be reduced in response to any major decrease in signal strength in the reference signal channel. Hence, a decrease in signal strength in either signal channel below a desired operating minimum (the signal input to the other channel remaining at normal level) results in the disabling of the other signal channel so the alarm indicator will be actuated.

Other objects, features, and advantages of the invention will become apparent in the following specification taken in conjunction with the accompanying drawings wherein.

Figure 1:
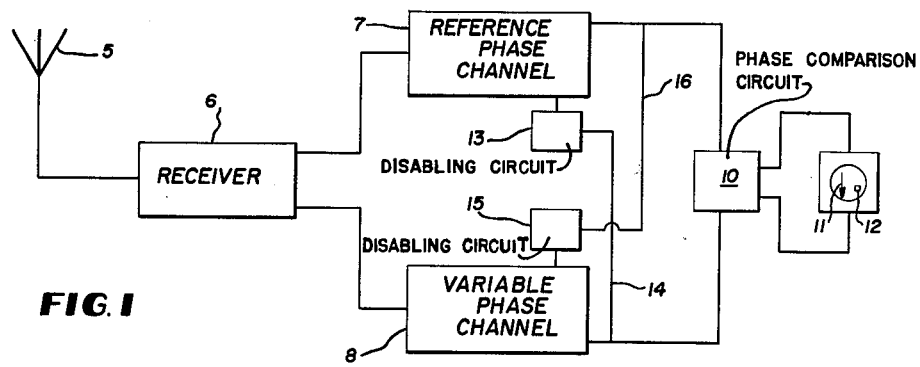
FIGURE 1 is a block diagram of an omnirange receiver embodying the invention.

As illustrated in FIGURE 1, energy from an omnirange transmitter is collected by an antenna 5 and supplied to a receiver 6 which separates a constant reference modulation signal from a variable modulation which depends upon the direction of the receiver with respect to the transmitter. Thus, the received signal is demodulated and supplied separately from receiver 6 to reference phase channel 7 and to variable phase channel 8. Outputs of the respective channels are supplied to a phase comparison circuit 10, which compares the phase of the variable signal to the phase of the reference signal, as in a conventional wattmeter circuit, and operates an indicator 11 to indicate the deviation from a desired course. By adjusting the phase shift introduced in one of the channels, indicator 11 can be zeroed for any desired radial of the VOR transmitter. Since a zero reading meter is subject to a false reading in the event of a failure of one of the circuits or in the event the signal level falls below an operating minimum, the indicator is provided with an alarm circuit to operate a flag 12 when there is a failure or a decay in signal strength.

An alarm indicator such as that shown at 12 in FIGURE 1 satisfactorily indicates the absence of signal in both channels. Usually the alarm device is adjusted to begin to show an alarm flag when the signal strength drops below one half of normal operating levels. However, if one of the channels maintains full signal strength, the other may drop well below the one half operating level or even fail completely without producing an alarm signal. In accordance with the invention, circuits are provided in each channel to reduce the sensitivity of the channel in the event the signal in the other channel falls below the desired operating minimum. Thus a disabling circuit 13 for reference phase channel 7 is coupled as by lead 14 to an output stage of the variable phase channel 8. In the event the signal level of variable phase channel 8 falls below the desired operating minimum, disabling circuit 13 is actuated to reduce the sensitivity of reference phase channel 7. This of course results in immediate response of the alarm indicator 12 because both channel outputs will be below operating minimum. Similarly, disabling circuit 15 is actuated by lead 16 from reference phase channel 7 to reduce the sensitivity of variable phase channel 8 in the event the signal level in reference phase channel 7 drops below the desired operating minimum. Thus reference channel 7 is provided with a disabling circuit 13 and variable channel 8 with a disabling circuit 15. The two disabling circuits are cross-connected so they are respectively operated upon by a decay in the signal strength in the other channel to reduce the sensitivity of their respective channels.

Figure 2:
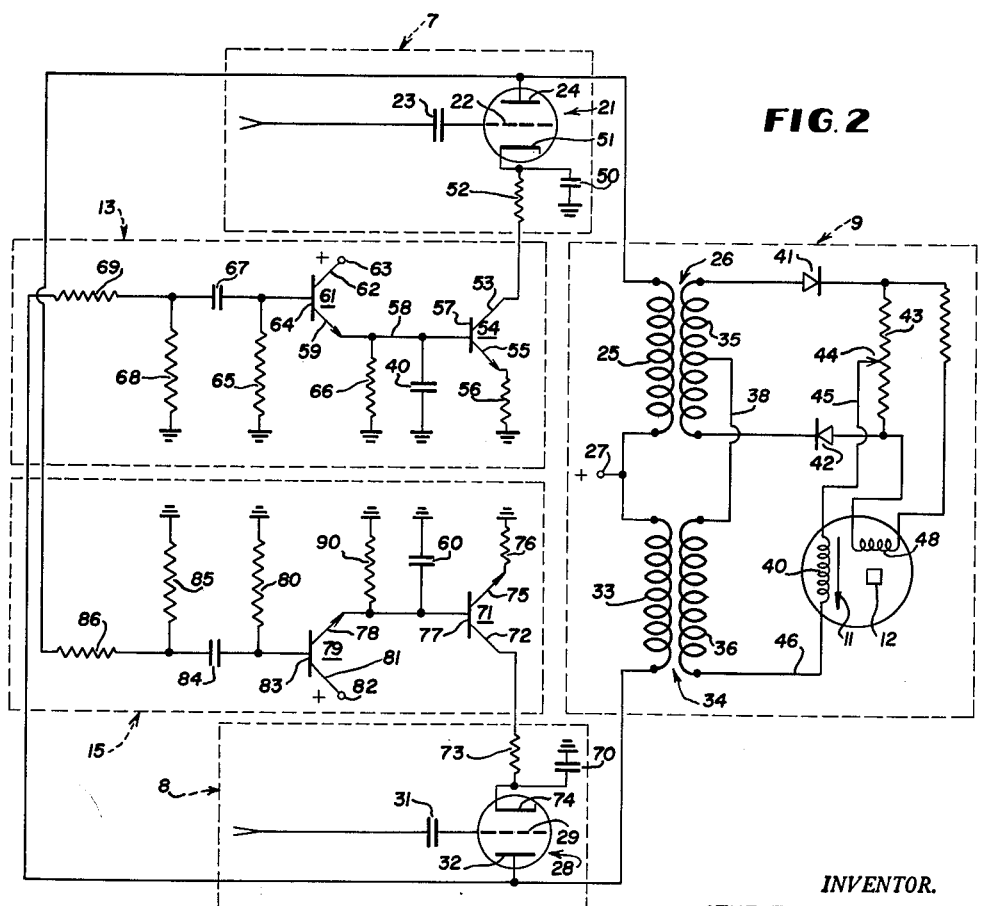
FIGURE 2 is a schematic circuit diagram of the output and indicating sections of an omnirange receiver embodying the invention in its preferred form.

As shown in FIGURE 2, the invention disables the output stages of reference phase channel 7 and variable phase channel 8 in response to a major decrease in the signal strength at the output stage of the other channel.

Output stage of reference channel 7 includes a triode 21 having a grid 22 supplied through coupling condenser 23 with a signal corresponding to the reference phase modulation of the omnirange transmitter. This reference phase modulation may be adjusted, as previously stated, for automatic needle indication on a desired radial of the VOR transmitter. Anode 24 of triode 21 is connected through primary winding 25 of a transformer 26 to a source 27 of high voltage potential.

Similarly, the output stage of reference phase channel 8 includes a triode 28 having its grid 29 supplied through coupling condenser 31 with a signal varying in phase in accordance with the azimuthal position of the receiver with respect to the omnirange transmitter. Anode 32 of triode 28 is connected through primary winding 33 of transformer 34 to source 27 of high voltage potential. Center tapped secondary winding 35 of reference phase channel transformer 26 and secondary winding 36 of reference phase channel transformer 34 are connected in what is usually identified as a wattmeter circuit with meter 11, which is usually the conventional vertical pointer of a cross pointer meter. Thus the wattmeter circuit and the indicator compose the indicating device 9 with the center tap of the secondary winding 35 and secondary winding 36 connected together by lead 38. Winding 35 supplies the output of the reference phase channel 7 through oppositely disposed rectifiers 41 and 42 across an output resistor 43 having an adjustable tap 44 connected by lead 45 to one side of coil 40 of the cross pointer meter 11, the other side of the cross pointer meter coil 40 being connected by lead 46 to one side of secondary winding 36 so the output of the variable phase channel is supplied from secondary winding 36 in like phase through the two halves of secondary winding 35 to opposite sides of output resistor 43.

With this conventional arrangement, vertical indicator 11 is deflected in a direction and amount corresponding to the direction and amount of the phase displacement of the variable phase signal with respect to phase quadrature with the reference phase signal to provide the pilot with an indication of his deviation from a desired course as determined by setting the phase shift of the reference phase channel. Tap 44 of output resistor 43 may be adjusted to balance the system.

Usually alarm flag 12 is operated by a coil 48 connected in a circuit across output resistor 43 so a decay in the signal strength appearing across output resistor 43 will result in the appearance of the flag 12 in a visual location on the meter 11. Flag 12 is moved by a satisfactory voltage across resistor 43 to an invisible location and returned by a spring (not shown) to a visible location in the event the signal across resistor 43 drops below a desired operating minimum.

As is apparent from an inspection of the phase comparator and indicator circuit 9 shown in FIGURE 2, the presence of a signal of desired strength in secondary winding 35 and secondary winding 36 will result in sufficient voltage across resistor 43 to deflect flag 12 to an invisible location. While such operation of alarm flag 12 is satisfactory in cases where the strength of the reference phase channel and the variable phase channel changes in the same proportion, a failure of some component in the reference phase channel could well result in the absence of a reference phase signal, but as long as the variable phase channel produces a sufficient signal output, the flag 12 will not appear. However, the vertical needle 11 will continue to provide a zero reading which indicates to the pilot that the aircraft is on course; whereas, in fact, it might well be deviating continuously from its desired course. The same situation could prevail in the case of a failure of the variable phase channel with a maintenance of sufficient signal strength of secondary winding 35 to hold the alarm flag 12 in an invisible location.

The present invention avoids this undesirable condition by insuring that a drop in the signal strength in either channel results in a sufficient drop in signal strength of both channels to decrease the voltage applied to flag coil 48 and insure movement of alarm flag 12 to a visible location to notify the pilot of trouble in the omnirange system.

In the form of the invention illustrated in FIGURE 2, a transistor is connected in the cathode circuit of reference channel output triode 21 and a similar transistor in the cathode circuit of the variable channel output triode 28. These transistors are controlled in accordance with the signal output of the opposite channel so the transistors are conducting as long as the output of the opposite channel is at a sufficient level. A drop in the level of the output of either channel will reduce the conductivity of the transistor in the other channel and thereby cause a partial cutoff of the output triode in that other channel.

Specifically, output triode 21 has its cathode 51 connected through a resistor 52 to collector 53 of an NPN type transistor 54. Condenser 50 is connected between cathode 51 and ground as a bypass for the 30-cycle signal. Emitter 55 of transistor 54 is connected to ground through resistor 56, and base 57 is connected through lead 58 to emitter 59 of another NPN type transistor 61 having its collector 62 connected to a source of positive potential 63.

In the absence of a signal on base 64 of transistor 61, transistor 64 is substantially non-conductive because base 64 and emitter 59 are both at ground potential. However, base 64 is connected through coupling condenser 67 to a point between resistors 68 and 69 forming a voltage divider across anode output circuit of triode 29 in the variable phase channel. A signal at anode 32 will be supplied through coupling condenser 67 to base 64 and, on alternate half cycles, will drive base 64 sufficiently positive to cause transistor 61 to conduct through emitter resistor 66 and thereby elevate the potential of emitter 59 as well as base 57 of transistor 54. This in turn causes transistor 54 to conduct heavily. The cathode bias of triode 21 is now determined essentially by resistors 52 and 56. These are chosen to provide normal operation for triode 21 so that the signal supplied through coupling condenser 23 is amplified and applied to primary winding 25 of transformer 26. Absence of a signal at plate 32 of variable channel triode 28 will render transistor 61 less conductive which in turn reduces the conductivity of transistor 54 and thereby substantially reduces the gain of triode 21 so the output signals applied to transformers 26 and 34 are both reduced and the voltage developed across output resistor 43 will be sufficiently low to cause flag coil 48 to move flag 12 into visible location. A smoothing condenser 40 is connected between base 57 and ground of transistor 54.

A similar disabling circuit is provided for the variable phase channel 8 with transistor 71 having its collector 72 connected through resistor 73 to cathode 74 of triode 28 and its emitter 75 connected through resistor 76 to ground. Condenser 70 is connected between cathode 74 and ground. Base 77 is directly connected to emitter 78 of transistor 79 having its collector 81 connected to a source 82 of positive potential and its base 83 connected through coupling condenser 84 to voltage divider composed of resistors 85 and 86 in the circuit of anode 24 of reference channel triode 21. Resistors 80 and 90 serve a similar function with respect to transistor 79 as does resistors 65 and 66 to transistor 61. A smoothing condenser 60 is connected between base 77 and ground. As in the case of the disabling circuit 13 for the reference channel, absence of the signal at the anode 24 of reference channel triode 21 renders transistor 79 substantially non-conductive, which in turn renders transistor 71 substantially non-conductive and reduces the gain of triode 29. In this condition, the reduction of a signal in transformers 26 and 34 reduces the voltage appearing across output resistor 43 sufficiently to reduce the cause current in flag coil 48 enough to permit flag 12 to move into visible location.

Figure 3:
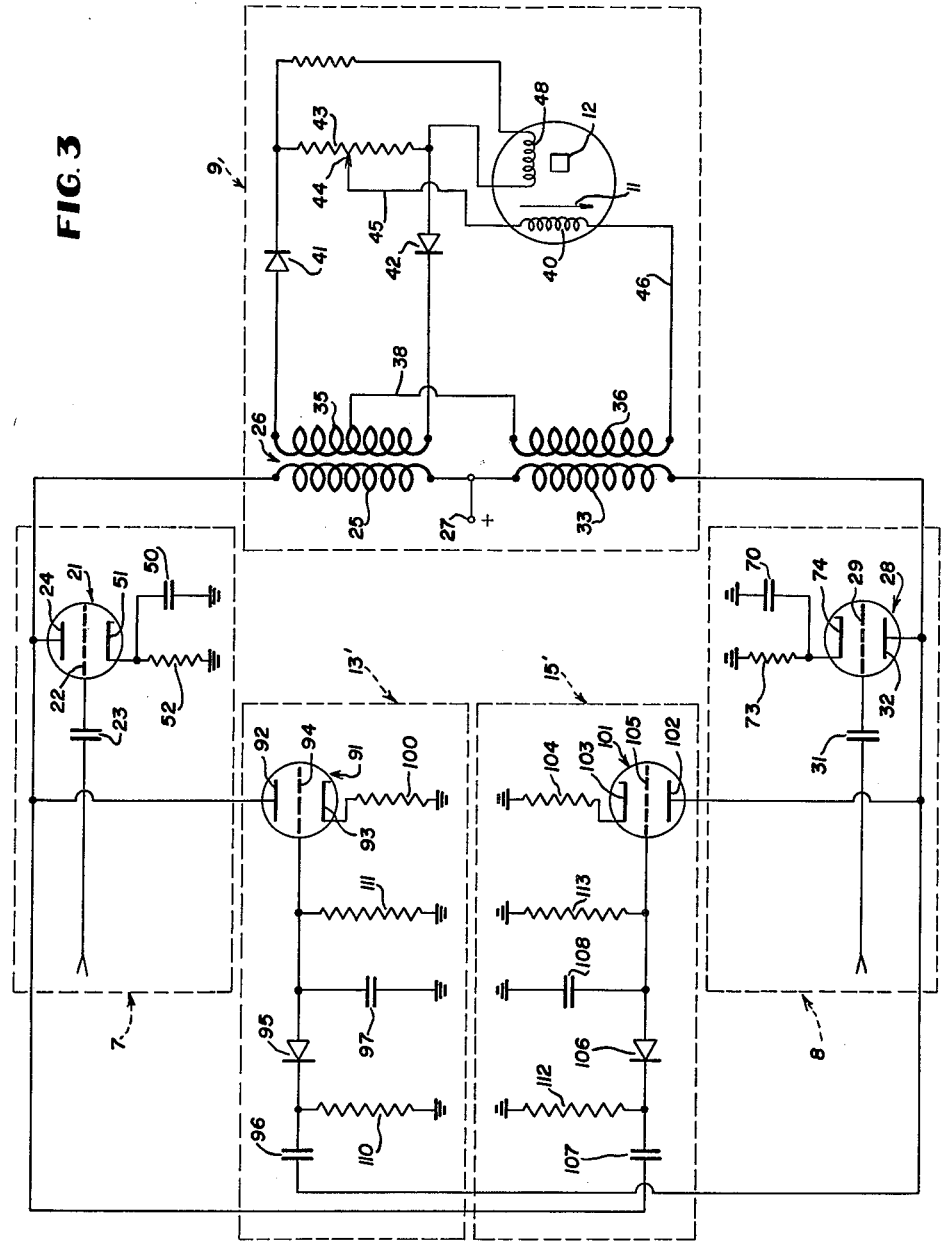
FIGURE 3 is a schematic diagram of the output and indicating elements of an omnirange receiver embodying a modified form of the invention.

In FIGURE 3 a modified form of disabling circuit is illustrated for the respective channels 7 and 8. Disabling circuit 13' for reference channel 7 includes a triode 91 having the circuit of its anode 92, cathode 93, and cathode resistor 100 connected in parallel with the circuit of anode 24 and cathode 51 of reference channel output triode 21. Disabling triode 91 has its grid 94 coupled through diode 95 and R-C coupling condenser 96 and resistor 110 to the output circuit of variable channel triode 28. Resistor 111 is connected between grid 94 and ground. Signal at anode 32 of triode 28 is rectified by diode 95 to charge condenser 97 connected to grid 94 negatively, and thereby maintains disabling triode 91 in non-conducting condition as long as the signal level in the output circuit of the variable channel is sufficiently high. Reduction in the signal strength in the output circuit of variable channel triode 28 will render disabling triode 91 conductive to the point that it sufficiently loads reference channel triode 21 to reduce the output of the reference channel applied to secondary winding 25 of reference channel transformer 26.

A similar disabling circuit 15' connected to the variable channel includes disabling triode 101 having its anode 102 connected to the anode 32 of triode 28 and its cathode 103 through a resistor 104 to ground. Grid 105 of disabling triode 101 is coupled through rectifier 106 and R-C coupling condenser 107, and resistor 112 to the circuit of anode 24 of reference channel output triode 21. Resistor 113 is connected between grid 105 and ground. As long as the signal level in the circuit of anode 24 of reference channel triode 21 is sufficiently high, the rectified signal charges condenser 108 in the circuit of grid 105 sufficiently to maintain disabling triode 101 in a cutoff state. Should the signal in the output circuit of reference channel triode 21 drop below a minimum operating level, the bias developed for grid 105 will likewise drop, and triode 101 will become sufficiently conductive to load variable channel output triode 28 and thereby effectively reduce the output of the variable channel circuit.

Thus reference channel triode 21 is provided with a disabling circuit in the form of triode 91 which is actuated in response to the output of variable channel triode 28 to reduce the output of reference channel triode 21 in the event the signal level in the output circuit of variable channel triode 28 falls below the minimum operating level. Likewise, disabling triode 101 is the circuit of variable channel output triode 28 is maintained in a non-conductive or low conductive state as long as the signal level in the output circuit of reference channel triode 21 is sufficiently high. Should the signal level in reference channel triode 21 drop below a minimum operating level, disabling triode 101 will be actuated to reduce the output of variable channel triode 28.

With this arrangement, a reduction in the signal level in either the reference channel 7 or the variable channel 8 will actuate disabling circuit in the other channel so the voltage across output resistor 43 of the indicator circuit 9 will be reduced to a point that the magnetic force developed by flag coil 48 is overcome by the action of a spring to move flag 12 into visible location. As long as the signal level in both channels is sufficiently high, both channels maintain a normal operating condition, and coil 48 moves flag 12 to an invisible location.

While two embodiments of the invention have been described and illustrated, it will be obvious to those skilled in the art that these embodiments may be modified and others substituted without departing from the invention. Therefore, this specification and the accompanying drawings are intended as illustration of the invention defined in the appended claims and should not be construed in a limiting sense.

What is claimed is:

1. In a radio navigation receiver having two signal channels and means for comparing the signals in the two channels for operating a direction indicator, an alarm circuit comprising disabling means in the circuit of each channel for decreasing the sensitivity of the respective channels, and cross-connections between the channels and said disabling means responsive to decrease in signal in either of the channels for actuating the disabling means in the other channel to reduce the sensitivity of said other channel, and indicator means operated by a decrease in signal strength in said channels.

2. In a radio navigation receiver having a first signal channel, a second signal channel, and means responsive to the signals in the two channels for operating a directional indicator, an alarm circuit comprising first disabling means in the first channel, second disabling means in the second channel, means responsive to a decrease in signal strength in the first channel for actuating said second disabling means to reduce the sensitivity of said second channel, means responsive to decrease of signal strength in the second channel for actuating said first disabling means to reduce the sensitivity of said first channel, and an alarm indicator operated by a decrease in signal strength in said channels.

3. In a radio navigation receiver having a reference signal channel and a variable signal channel, and means comparing the signals in the two channels for operating a directional indicator, an alarm circuit comprising disabling means in the reference signal channel responsive to a decrease in signal in the variable signal channel for reducing the sensitivity of said reference signal channel, disabling means in the variable signal channel responsive to a decrease in signal in the reference signal channel for reducing the sensitivity of the variable signal channel, and an alarm indicator operated by a decrease in signal strength in said channels.

4. In an omnirange radio receiver having a reference signal channel and a variable signal channel, and means responsive to the phase displacement of the signals in said channel for operating a directional indicator, an alarm circuit comprising disabling means in the reference signal channel responsive to a decrease in signal in the variable signal channel for reducing the sensitivity of the reference signal channel, disabling means in the variable signal channel responsive to a decrease in signal in the reference signal channel for reducing the sensitivity of the variable signal channel, and alarm means operated by a decrease in signal strength in said channels.

5. In an omnirange radio receiver having a reference signal channel, a variable signal channel, and means responsive to the signals in the two channels for operating a directional indicator, an alarm circuit comprising disabling means in the circuit of each channel for reducing the sensitivity of the respective channels, cross-connections between the channels and said disabling means responsive to a decrease in signal in either of the channels for reducing the sensitivity of the other channel and alarm indicator means responsive to a decrease in the signal in the circuit of the directional indicator for indicating inoperativeness of the receiver.

References Cited in the file of this patent

UNITED STATES PATENTS

| | | |
|---|---|---|
| 2,438,526 | Waterman | Mar. 30, 1948 |
| 2,489,248 | Abraham | Nov. 29, 1949 |
| 2,490,050 | Hansel | Dec. 6, 1949 |
| 2,808,564 | Brandt et al. | Oct. 1, 1957 |